May 27, 1930.　　　A. KANER　　　1,760,144
RUMBLE SEAT INCLOSURE
Filed Dec. 22, 1927
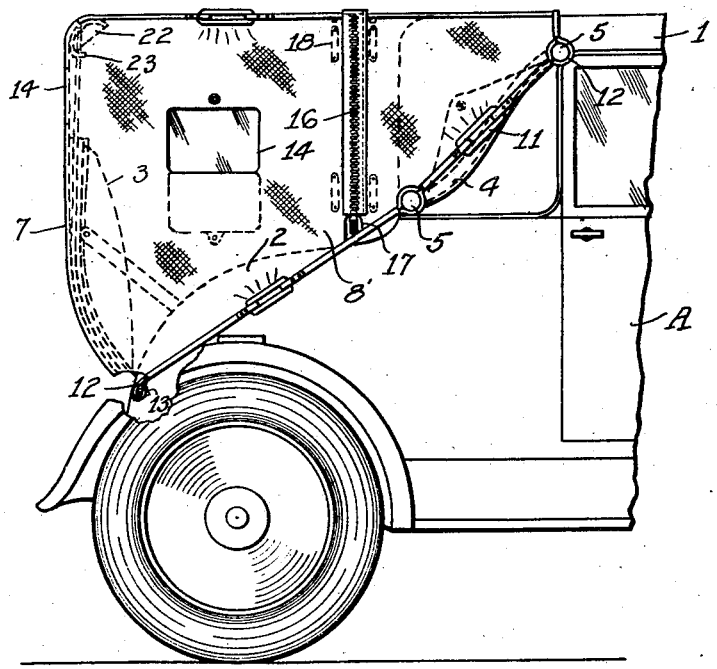
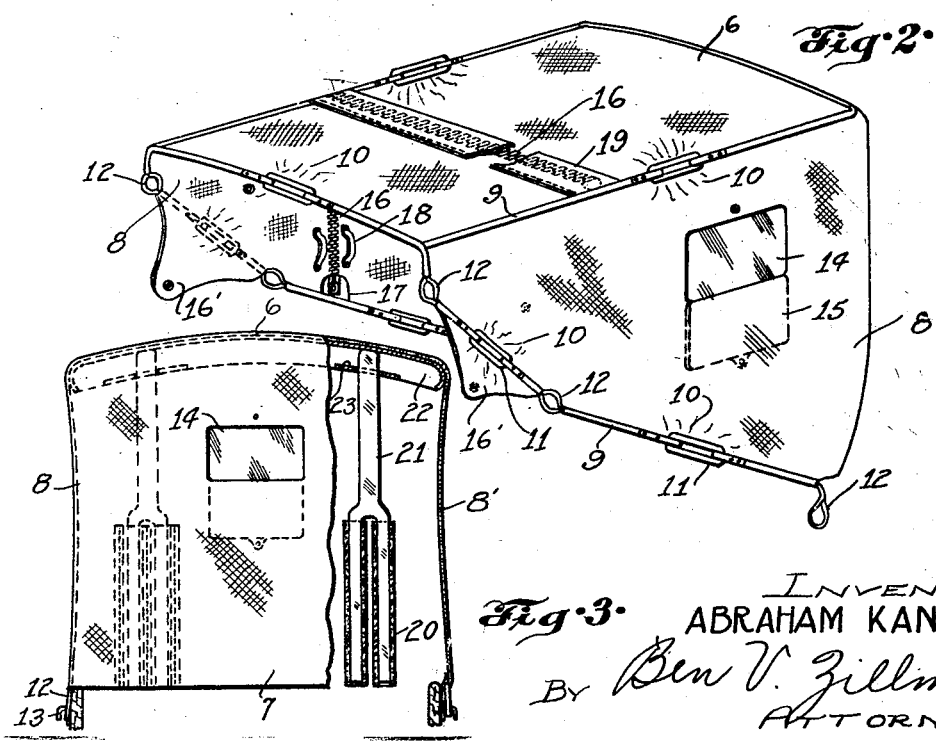
INVENTOR
ABRAHAM KANER
By Ben V. Zillman
ATTORNEY Patented May 27, 1930

1,760,144

UNITED STATES PATENT OFFICE

ABRAHAM KANER, OF ST. LOUIS, MISSOURI

RUMBLE-SEAT INCLOSURE

Application filed December 22, 1927. Serial No. 241,799.

My invention relates to improvements in inclosures for rumble-seats of vehicles, particularly motor-vehicles, and has among its objects, the production of a device of the kind described, which shall be simple, convenient, light and compact, durable, sturdy, weather tight, and efficient and satisfactory for use wherever found applicable.

Ordinarily, the occupants of rumble seats ride with much discomfort and inconvenience, on account of the fact that such occupants are exposed to the elements such as rain, sun, snow, wind, become covered with dust, and have no privacy, and in addition to other inconveniences they must converse in sufficiently loud tones to overcome the street noises. Therefore these seats are little used, and are of small value to the purchaser of the automobile.

My invention has among its objects, the production of an auxiliary device adapted to be detachably connected to the motor vehicle with very little effort, and with great speed, to enclose the occupants of this rumble seat and give them practically the same advantages as the occupants of the cab of the automobile.

Many other objects and advantages of the construction herein shown and described, will be obvious to those skilled in the art to which this invention appertains, from the disclosures herein given.

To his end my invention consists in the novel construction, arrangement and combination of parts herein shown and described, and more particularly pointed out in the claim.

In the drawings, wherein like reference characters indicate like or corresponding parts throughout the views, Figure 1 is a side elevation, showing my improved inclosure in position upon a motor vehicle;

Figure 2 is a perspective view of the inclosure; and

Figure 3 is a rear view of the same, showing parts in section.

In the drawings, wherein I have illustrated the preferred embodiment of my invention, $a$ indicates a motor vehicle of any suitable shape and size, the same having the usual cab portion 1, with a rumble-seat 2 therebehind. The rumble-seat opens into the body of the automobile, and is normally closed with the door 3, hinged in a horizontal axis along the rear edge of the rumble-seat opening, the seat being generally upholstered as shown. At each side of the cab portion of the vehicle, and generally extending diagonally from the roof to the top of the rumble-seat portion of the body, is a brace, bar or handle 4, provided with one or more knobs 5, as shown.

The inclosure for this seat comprises four main wall portions, the same being the top wall 6, rear wall 7, and the pair of side walls 8 and 8', the latter being made in two sections for a purpose to be more clearly hereinafter described. These walls are made of some suitable flexible, fabric that is able to withstand the weather conditions that may be encountered, as for example of canvas or the like.

These wall elements are sewed or otherwise suitably secured together along their adjacent edges to form the substantially wedge-shaped cover shown, the edges being reinforced by means of a cord or cable 9 if so desired. At one or more points along the length of the edges, there is provided a certain amount of fullness as at 10, so that the inclosure may be more easily applied in position upon the vehicle, and in order that this excess material or fullness may be taken up after the inclosure is mounted in said position, elastic bands 11 are inserted along the edges to form a part of the same as shown, these endless bands being held in place by snap fasteners, buckles or the like at either side thereof so that they may be replaced as needed. Loops 12 are provided at the lower rear ends of the inclosure, as well as at points adjacent the forward edges, the former loops being adapted to interengage with hooks 13 provided on the body of the automobile adjacent and below the rumble seat, and the loops at the forward end of the inclosure are adapted to be received upon the knobs 5 of the bar 4.

Lights or windows 14 may be provided at the rear and sides of the inclosure, and may be covered up with flaps 15 hinged along one edge thereof when so desired.

Tabs 16' project downwardly from the forward ends of the side pieces of the device between the forward pair of loops and are equipped with snaps so that these tabs may be inserted between the handles 4 and the body of the car and thence folded back and retained in place, to not only assist in maintaining the device in place, but will serve as baffles to prevent too much wind from entering into the inclosure at these places.

The adjacent sections of the side wall 8' as well as those of the top wall piece 6 are detachably secured together along their meeting edges by means of a continuous fastener of a well-known type, indicated at 16, this fastener being operable from either within or without the inclosure by providing a cut-out 17 at the lower ends of the meeting edges of the sections of the side wall 8'. In this manner the inclosure may be opened to the desired degree for ingress to and egress from the rumble-seat, rapidly and easily. To more easily enable the adjoined sections to be fastened, hand-holds 18 may be provided at one or more points along the length of the meeting edges, as shown, these elements 18 being held together, one on each side of the meeting edges, while pulling the hook of the fastener.

A flap 19 may be sewed along one edge, preferably the forward edge, so as to overlie said adjoined edges of the meeting sections and keep water from entering into the inclosure from without.

Vertically extending pockets 20 are provided on the interior of the rear wall section 7, there being a double pocket at either side of the rear section 7 as shown, and a bar 21 having its lower end forked to slidably enter the pocket is arranged in each pocket so as to conform to the contour of the back of the door 3 and project upwardly substantially vertically therefrom to the elevation of the roof of the cab portion 1 of the vehicle. These pockets may be formed of leather or some other suitable material that may lie against the door without scratching the same, and which will not quickly wear through due to the movement of the vehicle, and if further protection is desired, felt or the like may be inserted in the pockets as a liner therefor.

A stiffener plate or angle member 22 having the longitudinal edges as well as the side pieces thereof rounded off so as not to unduly wear upon the fabric material of the inclosure, is inserted along the corner formed within the inclosure by the meeting of the adjacent edges of the top and rear wall, the corner edge being inturned and the angle member having a longitudinal recess formed therealong to receive the inturned seam, to aid in positioning the plate and preventing relative movement therebetween. Lugs or ears 23 are provided at spaced points along the lower edge of the plate, and have apertures therethrough to receive the upper ends of the bars 21, the free upper tips of the bars bearing against the top of the angle member 22, to thereby interconnect the bars and plate to prevent relative lateral movement therebetween.

When the inclosure is mounted in place upon a vehicle, in the position shown in the drawings, with the forward open end of the inclosure brought over the roof of the cab to the most forward of the knobs 5, the substantially vertically extending bars 21 will support the rear end of the inclosure across the full width thereof, and the edges of the inclosure will snugly engage against the body of the car, the elastic inserts serving to take up any slackness or fullness of the inclosure. Passengers within the inclosure will be in practically equal comfort with the passengers in the cab portion of the vehicle, and full use can be made of the rumble seats.

Having thus described my invention, it is obvious that various immaterial modifications may be made in the same without departing from the spirit of my invention; hence I do not wish to be understood as limiting myself to the exact form, construction, arrangement and combination of parts herein shown and described, except as limited by the claim.

What I claim as new and desire to secure by Letters Patent is:

An auxiliary inclosure for the rumble seat of an automobile, comprising side walls of substantially triangular shape, a top wall between said side walls, and a rear end wall connected to the rear edges of both side walls and top wall, stiffener means carried by said rear wall and extending upwardly between the top and bottom edges of said rear wall and terminating at the top of the vehicle, means for detachably mounting said inclosure upon said vehicle, and a corner plate connected to the ends of said stiffener means at the inside of the corner formed by the meeting of the top and rear walls and overlying the stiffener means so that said top wall is not supported on the tops of said stiffener means.

ABRAHAM KANER.